(12) United States Patent
Chefalas et al.

(10) Patent No.: US 7,089,589 B2
(45) Date of Patent: Aug. 8, 2006

(54) METHOD AND APPARATUS FOR THE DETECTION, NOTIFICATION, AND ELIMINATION OF CERTAIN COMPUTER VIRUSES ON A NETWORK USING A PROMISCUOUS SYSTEM AS BAIT

(75) Inventors: Thomas E. Chefalas, Somers, NY (US); Steven J. Mastrianni, Unionville, CT (US); Ajay Mohindra, Yorktown Heights, NY (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 657 days.

(21) Appl. No.: 09/829,761

(22) Filed: Apr. 10, 2001

(65) Prior Publication Data

US 2002/0147915 A1    Oct. 10, 2002

(51) Int. Cl.
*G06F 11/00* (2006.01)

(52) U.S. Cl. .............. 726/22; 726/23; 726/24
(58) Field of Classification Search ........ 713/187–189, 713/193, 200–202; 709/223–225, 227–229; 726/22–26
See application file for complete search history.

(56) References Cited

U.S. PATENT DOCUMENTS

| | | | |
|---|---|---|---|
| 5,414,833 A | | 5/1995 | Hershey et al. |
| 5,440,723 A | * | 8/1995 | Arnold et al. ............ 714/2 |
| 5,960,170 A | | 9/1999 | Chen et al. |

(Continued)

FOREIGN PATENT DOCUMENTS

DE    19734585    2/1999

(Continued)

OTHER PUBLICATIONS

SV.internet.com Staff. Network Associates Ships CyberCop Sting. Jul. 14, 1999. Serverwatch. pp. 1-3.*

(Continued)

*Primary Examiner*—Hosuk Song
(74) *Attorney, Agent, or Firm*—Duke W. Yee; Gerald H. Glanzman

(57) ABSTRACT

A method, computer program product, and network data processing system for identifying, locating, and deleting viruses is provided. In one embodiment, the network data processing system includes a local server, several client data processing systems, and a bait server. The address of the bait server is not published to the clients. Thus, any attempt to access the bait server would indicate the presence of a virus on the client attempting access. The bait server monitors itself and, responsive to an attempt from a client to access the bait server, broadcasts an indication that a virus attack is underway to all devices within the network. The bait server then ignores all further access requests by the offending client until it receives an indication that the offending client has been disinfected and directs the local server to disconnect the offending client(s) from the network. The bait server also notifies the local server and/or a network administrator of the problem and the identity of the offending client allowing appropriate action to be initiated to disinfect the offending client.

15 Claims, 3 Drawing Sheets

U.S. PATENT DOCUMENTS

| | | | | |
|---|---|---|---|---|
| 5,991,881 A | * | 11/1999 | Conklin et al. | 713/201 |
| 6,397,335 B1 | | 5/2002 | Franczek et al. | 713/200 |
| 6,567,808 B1 | * | 5/2003 | Eschelbeck et al. | 707/10 |
| 6,647,400 B1 | * | 11/2003 | Moran | 707/205 |
| 6,658,465 B1 | * | 12/2003 | Touboul | 709/223 |
| 6,701,440 B1 | * | 3/2004 | Kim et al. | 713/201 |
| 6,886,099 B1 | | 4/2005 | Smithson et al. | 713/200 |
| 2004/0025052 A1 | | 2/2004 | Dickenson | 713/201 |

FOREIGN PATENT DOCUMENTS

GB      2364142      1/2002

OTHER PUBLICATIONS

Chess, "Computer Viruses and Related Threats to Computer and Network Integrity", Computer Networks and ISDN Systems, 17 Jul. 10, 1989, No. 2, Amsterdam, NL, pp. 141-148.

* cited by examiner

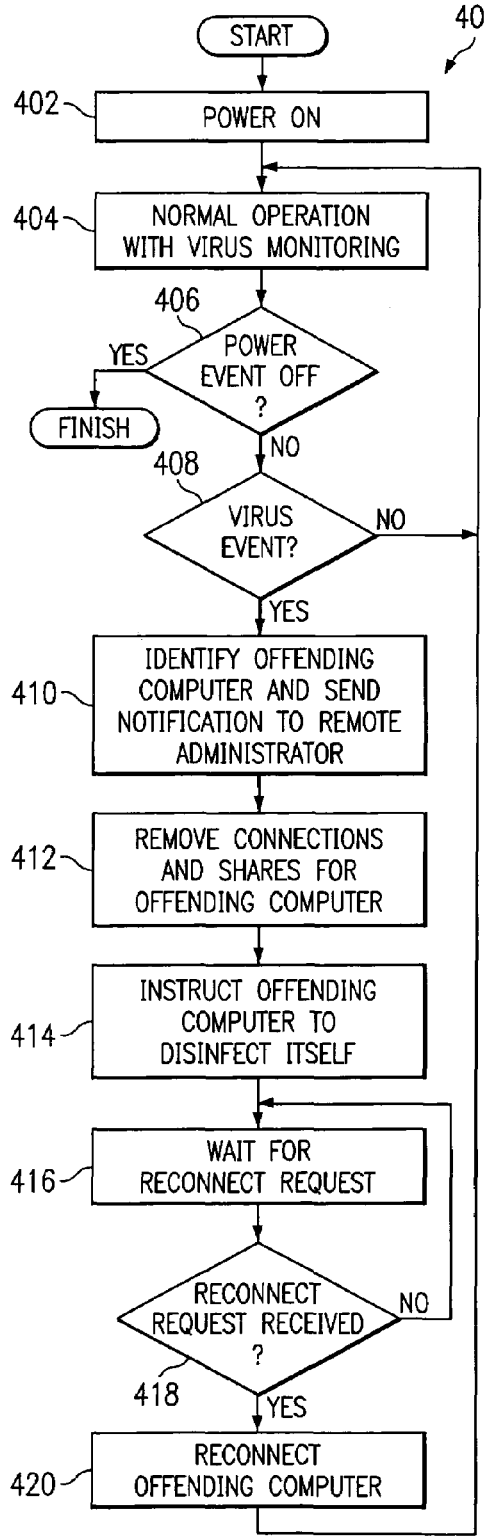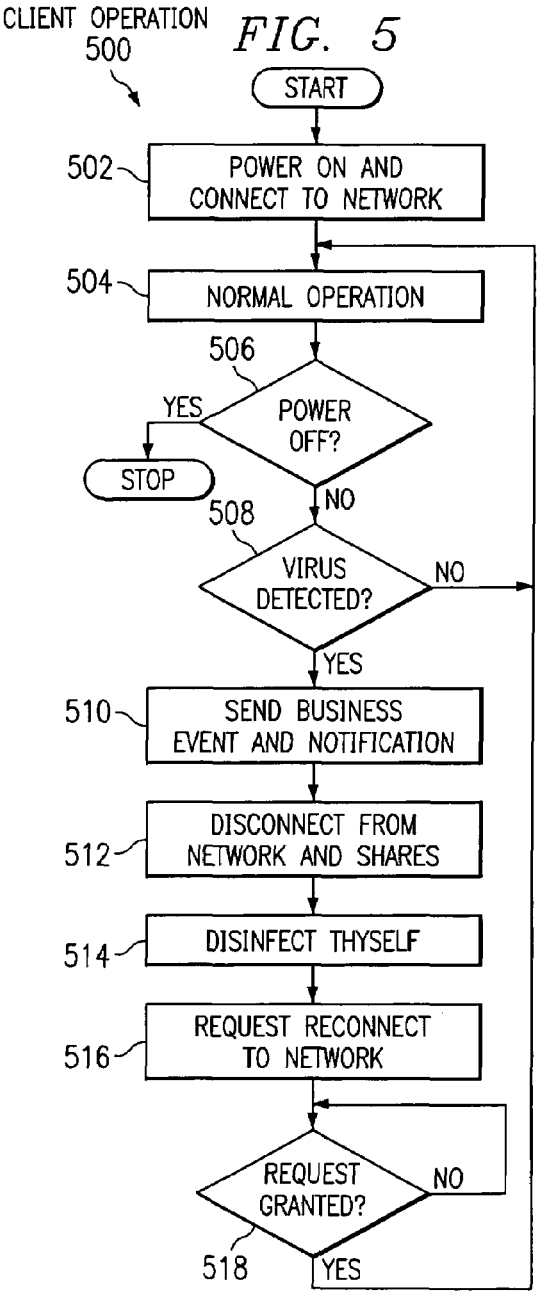

METHOD AND APPARATUS FOR THE DETECTION, NOTIFICATION, AND ELIMINATION OF CERTAIN COMPUTER VIRUSES ON A NETWORK USING A PROMISCUOUS SYSTEM AS BAIT

CROSS-REFERENCE TO RELATED APPLICATIONS

The present application is related to co-pending U.S. patent application Ser. No. 09/789,867 entitled "METHOD AND APPARATUS FOR PROVIDING A BUSINESS SERVICE FOR THE DETECTION, NOTIFICATION, AND ELIMINATION OF COMPUTER VIRUSES" filed on Feb. 20, 2001. The content of the above mentioned commonly assigned, co-pending U.S. patent application is hereby incorporated herein by reference for all purposes.

BACKGROUND OF THE INVENTION

1. Technical Field

The present invention relates to methods and apparatus for providing a business service to identify the source of a computer virus on a network using a promiscuous system.

2. Description of Related Art

The detection of computer viruses is a well-understood technology. There are several large companies involved in the business of virus detection and elimination including Symantec, McAffee, Shiva, and Intel. Some of these products, specifically Symantec, offer a corporate version of their software for administration and use on internal corporate networks, or intranets. In this configuration, the virus detection client software is installed on each client computer and the virus checker is run at specified intervals to check for viruses on that client machine. If a virus is detected, the client program informs the user that a virus has been detected and takes automatic action or prompts the user for an action depending on the administrative settings.

When a virus is detected, the user is generally instructed to quarantine the infected file or files, removing them from use on the current system. Once the files have been quarantined, the user can begin to use the system once again. The user may then be instructed to contact the system administrator or IT department to alert them of the virus.

The problem with this strategy is that significant damage to the system may already be done before the virus is detected. Some viruses called worms [Syman1] are capable of destroying hundreds or even thousands of files before they are detected. Worse, by the time the client machine has detected the virus, the virus may have cloned itself on another machine on the network or on a network share. From the network share, the virus can begin deleting files and cloning itself onto other client systems. Finding the source of the virus and removing any trace of it on the network usually requires that the network server be shut down, the network shares removed, and each client machine disinfected while disconnected from the network.

To be sure a virus has been totally eliminated, it is desirable to know where the virus originated so that particular machine can be properly disinfected. This can be difficult to determine, however, especially in large corporate networks where the user may not have anti-virus software installed, or a where they have dialed in, unknowingly deposited a virus, and then logged off. If the network is disinfected, it will become infected again when the offending user reconnects. It is important to identify the offending system to prevent re-infection from occurring.

In most cases, the offending user spreads the virus without realizing it. A class of viruses called "worms" work by erasing files or setting their file length to zero, effectively rendering them useless. Worms are usually not recognized by firewall software or filters, and arrive at the users machine looking like a normal executable image or script file. When the user clicks on the file, it immediately clones itself and looks for a new system on the network to be a willing host for the worm. When it finds a willing host, it installs itself and runs again, looking for yet another willing host. These worms need a willing and promiscuous host to provide them with the privileges necessary to do their nasty deed. They seek out systems on the network that have write access to computers or shares, then use that capability to remove files on other systems.

In most networks, it is normal practice for the systems to access a shared storage of some type, perhaps another computer's hard drive, as a shared medium. This is referred to as a share or network share, and it allows users to easily share information, programs, files, and documents located in a single place. Each system that requires access to the share has that access granted to it by the system administrator or by the policies of the network server. Systems without access to the share cannot read from or write to the share. Read and write access can be granted separately for each system that has access to the share.

In the case of viruses that replicate with other systems, it is likely that the virus had already replicated before the detection. In this case, disinfecting the current system will not help, since the virus will quickly replicate itself back on the current system. In order to effectively disinfect the neighboring machines, each machine must be disconnected from the network, disinfected, and then placed back on the network only after each networked client has been checked and disinfected. The source of the worm must be found and eliminated, otherwise the risk of re-infection is extremely high.

This can be a lengthy procedure, and can be difficult for novice users or administrators to implement. Although most corporations with large networks have policies against downloading potentially harmful content, smaller companies with less experienced staff are more likely to download potentially harmful content.

Therefore, a method, system, and computer program product that allows viruses to be detected, located, and eliminated without requiring great skill on the part of an administrator is desirable.

SUMMARY OF THE INVENTION

The present invention provides a method, computer program product, and network data processing system for identifying, locating, and deleting viruses. In one embodiment, the network data processing system includes a local server, several client data processing systems, and a bait server. The address of the bait server is not published to the clients. Thus, any attempt to access the bait server would indicate the presence of a virus on the client attempting access. The bait server monitors itself and, responsive to an attempt from a client to access the bait server, broadcasts an indication that a virus attack is underway to all devices within the network. The bait server then ignores all further access requests by the offending client until it receives an indication that the offending client has been disinfected and disconnects the offending client from the network. The bait server also notifies the local server and/or a network administrator of the problem and the identity of the offending client allowing appropriate action to be initiated to disinfect the offending client.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a process flow and program function for execution on a bait server for detecting, locating, and eliminating a computer virus in accordance with the present invention; and FIG. 5 depicts a process flow and program function which may be implemented on a client for detecting the presence of a virus in accordance with the present invention.

DETAILED DESCRIPTION OF THE PREFERRED EMBODIMENT

Figure 1:
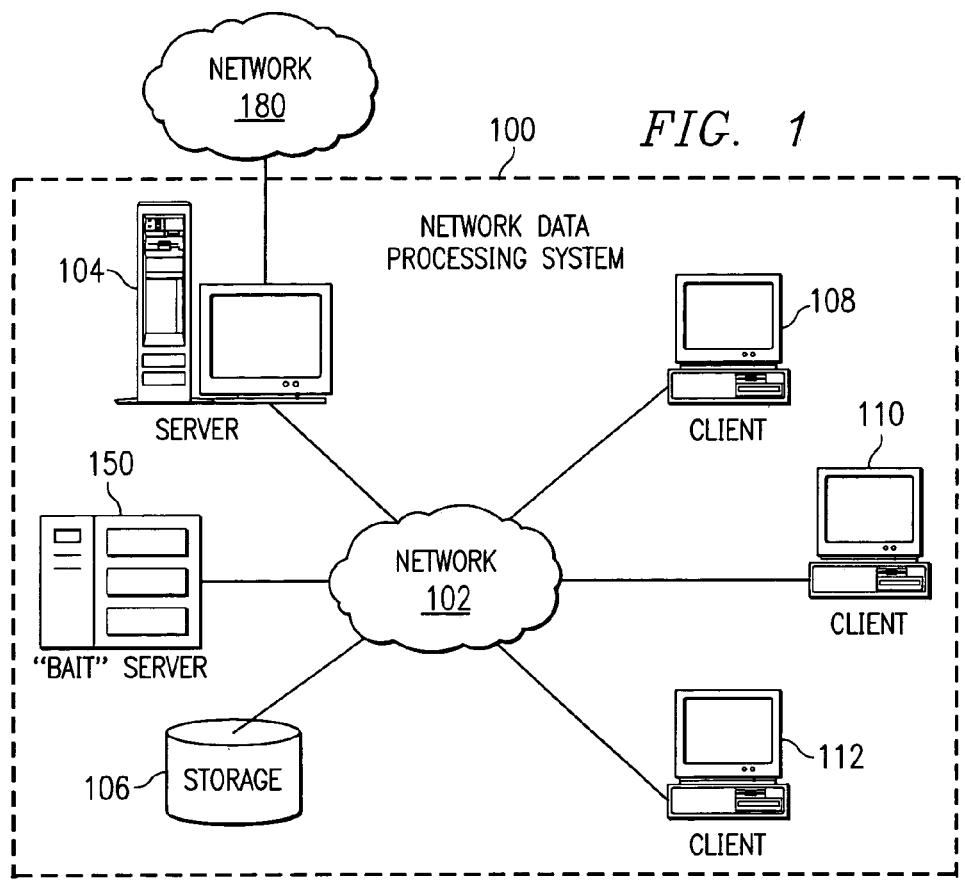
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102, as well as bait server 150. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown. In the depicted example, network data processing system 100 is an intranet, local area network (LAN) or other type of private network, such as might be utilized by a business or university. Network 102 represents a collection of networks and gateways that use a suit of protocols, such as the TCP/IP suit or protocols, to communicate with one another. Server 104 also provides a connection between network data processing system 100 and an external network 180 which may be, for example, the Internet.

External network 180, if implemented as the Internet, represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages.

A special server, referred to as the "bait server" 150 is installed on the network 102 to act as promiscuous host for a network worm virus. As used herein, the term virus includes viruses, worms, Trojan horses, and any other type of mischievous program designed to interfere with the normal operation of a data processing system or network. The bait server 150 is configured to monitor all network and logon traffic to itself using security monitoring software. The bait server's machine name or IP address is not advertised, and no users are allowed to logon to the machine 150. When a network or logon request is made to the bait server 150, the bait server 150 can conclude that since the request was unexpected and came from within the network 102 that the request came from a worm virus trying to copy itself from an infected machine to the bait server 150.

When the virus is launched from a client computer such as 108–112, it quickly locates a promiscuous system on the network with write access to other remote file systems or network shares. The virus attempts to copy itself to the bait server 150, but the packet monitoring software in the bait server 150 detects the infected system's attempt to write to the bait server 150, and traps the data. The bait server 150 immediately notifies the server 104 which terminates the connection with the offending system and refuses any subsequent attempt of the offending system to log on or attach to the network 102. The server 104 then notifies the remote administrator with a business event and notifies the system manager via email and/or pager.

As an additional precaution, the bait server 150 continually monitors the condition of the bait server files, continually verifying their size and validity. If the bait server detects that the size of one of the bait server 150 files have changed or are no longer present, the bait server notifies the local server 104 that a virus has been detected by sending events to the local server 104 which removes any connections and begins the disinfection process for itself and other computers and shares on the network. While the bait server 150 may not always catch the source of the virus before some initial damage is done, it will catch the offender in a very short time, minimizing damage.

Thus, the present invention provides for an automated solution to this problem by providing a set of hardware and software components that perform the task of identifying the source of a network-resident computer virus without involving highly-skilled network administrators or technicians. This automated function can be provided in software installed on the network server 102 and client computers 108–112, in addition to the addition of the bait server 150, or supplied as a business service that users can sign up for.

If a virus is detected by the bait server 150 or the client anti virus software, and the virus is a worm, the server must find the source of the virus and make sure that the machine that the virus originated on is disinfected before allowing it to reconnect to the network 102 or shares.

If the present invention is being supplied as a business service, the bait server 150 immediately notifies the remote administrator by sending it a "virus detected" business event and also sending an e-mail message to the remote administrator with information about the type of virus detected, the name of the client it was detected on, and the steps taken to disinfect the system. The bait server 150 can also page a technician, initiate a phone call with a support technician.

Upon receiving the notification, the administrator event routing system may in turn generate other business events, schedule an on-site service call or phone call to the customer, page a technician, or in extreme cases, even shut down the local server and/or the local area network.

To locate the offending computer, the bait server 150, as discussed above, is installed on the network 150 to act as "bait" and a magnet for the worm virus. This category of viruses, known as worms, work by trolling the networking looking for a computer to host the virus that has write capabilities on system shares. The virus uses various techniques for locating network servers, including NETBIOS broadcasts. Using the NETBIOS protocol, the virus locates a server on the network with a write access to other computers or network shares. It then copies itself to the server, installs itself as a service and launches the service each time the operating system is started or a user logs on. Once running, the virus begins deleting local files, remote files, and files on network shares. Without immediate intervention, the virus can delete or render useless thousands of files every minute.

The bait server 150 is configured to monitor login and network requests from machines on the network 102. Since the bait server 150 is unknown by the users of the network 102, the only system that would ever try to logon to the bait server 150 or send it data via the network 102 is the virus itself. The bait server 150 is configured with security monitoring enabled, and all network and security requests are monitored. The bait server 150 is configured as openly as possible, with write enabled to an isolated public network share which is in reality a local disk drive.

Installed on that network share are files usually targeted by the worm virus, such as .DOC, .PPT, .H, .CPP, .C, .ASM, and .XLS. Once a logon request arrives at the bait server machine 150, the bait server 150 immediately severs the connection to the requesting computer and generates a business event to the remote administration server and sends a priority e-mail message to the system administrator. Each message contains information such as the time, date, IP address and name of the offending machine, and the user ID and password the virus is trying to use. The bait server 150 then broadcasts a message across the network that a virus attack is under way.

The same action is taken if a write request to the share arrives at the bait server 150. Again, the IP address of the sending machine, machine name, virus type, and other information is collected and sent to the local server 104 for routing. One condition that allows the present invention to work well is the fact that the viruses are "smart" enough to go after the most promiscuous machines first, exposing themselves early.

Once removed from the network 102, the offending machine's log on account is disabled. Any subsequent requests from the IP address or machine name that generated the virus event are ignored until it has been determined that the virus has been removed from the network and the offending machine has been disinfected. At such time, the offending machine is reconnected to the network 102 and normal operation of the network proceeds.

FIG. 1 is intended as an example, and not as an architectural limitation for the present invention.

Figure 2:
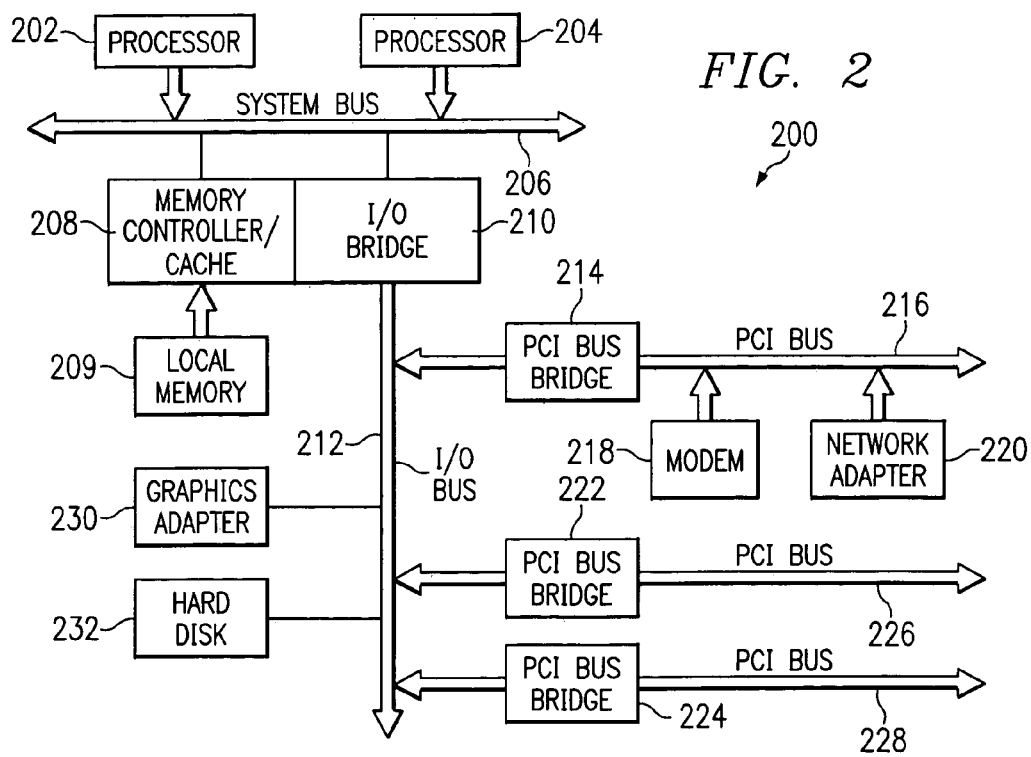
FIG. 2 depicts a block diagram of a data processing system that may be implemented as a server in accordance with the present invention.

Referring to FIG. 2, a block diagram of a data processing system that may be implemented as a server, such as "bait" server 150 or server 104 in FIG. 1, is depicted in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
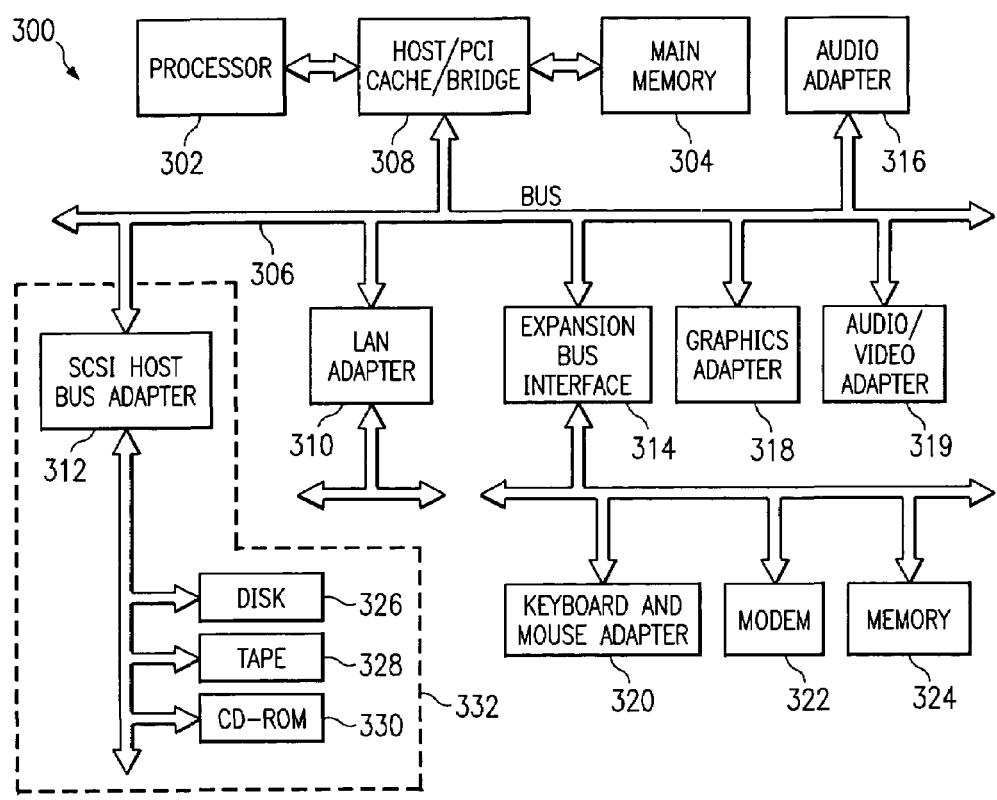
FIG. 3 depicts a block diagram illustrating a data processing system that may be implemented as a client in accordance with the present invention.

With reference now to FIG. 3, a block diagram illustrating a data processing system that may be implemented as a client is depicted in accordance with the present invention. Data processing system 300 is an example of a client computer, such as, for example, any one of clients 102–110 in FIG. 1. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

With reference now to FIG. 4, a process flow and program function for execution on a bait server for detecting, locating, and eliminating a computer virus is depicted in accordance with the present invention. Process 400 may be implemented on, for example, bait server 150 in FIG. 1. To begin, the bait server is powered on 402 and begins normal operation with virus monitoring 404. If a power off event occurs (step 406), the process ends. However, until the bait server is powered off, the bait server continually monitors itself to determine whether a virus event has been detected (step 408).

The bait server may detect a virus event, for example, by observing an attempted access to the bait server, such as by attempting to write data to the bait server. Since the address of the bait server is not published and performs no other function for the network, any attempt to access the bait server is suspicious and indicates the presence of a virus on the network. As an additional precaution, the bait server may continually monitor the condition of the bait server files, continually verifying their size and validity. If the bait server detects that the size of one of the bait server files has changed or is no longer present, this may indicate the presence of a virus. The location of the offending computer from which the virus attempts to access the bait server is identified by noting the address of the computer requesting access to the bait server.

If a virus event is not detected, the bait server continues with normal operation and virus monitoring (step 404. If a virus event is detected, the bait server sends a message to a remote administrator (step 410) informing the remote administrator that a virus has been detected and the identity of the computer within the network from which the virus originated. The bait server then removes the connections and shares for the offending computer (step 412) while instructing the offending computer to disinfect itself of the virus (step 414).

The bait server than awaits a reconnect request from the offending computer (step 416). If a reconnect request has not been received (step 418), the bait server continues to wait (step 416). However, even during the period in which the bait server is identifying an offending computer from which a virus has originated, notifying an administrator, disconnecting the offending computer, and waiting for a reconnect request, the bait server continues to monitor itself for other virus events. When a reconnect request is received, the bait server reconnects the offending computer (step 420) and continues with normal operation and virus monitoring (step 404).

Thus, the bait server allows for viruses to be detected and removed relatively quickly typically preventing severe damage or disruption to the network. Furthermore, by determining the identity of the computer from which the virus has first gained entry into the network, that computer may be disconnected and disinfected before the virus has time to infect many more computers within the network.

If the offending computer from which the virus has entered the network is the local server, the operation is basically the same as for a client computer. The bait server sends the clients a virus attack message which causes them to disconnect and remove their connections. the local server insures that all connections have been removed, disinfects itself, then reconnects to the clients as they come available.

With reference now to FIG. 5, a process flow and program function which may be implemented on a client for detecting the presence of a virus is depicted in accordance with the present invention. Process 500 may be implemented on, for example, any of clients 108–112 in FIG. 1. To begin, the computer is powered on and connected to the network (step 502). The computer then enters normal operation (step 504). If a power off event occurs (step 506), the process obviously ends. Until a power off event occurs, the computer continues with normal operations and determines whether a virus has been detected by the bait server by awaiting a notification from the network (step 508). If no notification is received indicating the presence of a virus on the computer, the computer continues with normal operation (step 504).

If a virus notification is received indicating the presence of a virus on the computer, the computer may send a notification to its owner by, for example, presenting a message on a display or paging its owner or user (step 510). The computer is then disconnected from the network (step 512) and then disinfects itself (step 514). The computer may disinfect itself by automatically running a virus detection and removal program such as any one of a variety of commercially available products. Alternatively, the disinfection process may require significant user intervention and perhaps the services of a professional such as a network administrator.

Once the computer has been disinfected of the virus, the computer sends a request to reconnect to the network (step 516) and waits for the request to be granted. The computer then determines whether the request has been granted (step 518) and, if not, continues to wait. If the request is granted, the computer is connected to the network and continues with normal operation (step 504).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for detecting the presence of a computer virus, the method comprising;
    receiving, at a bait server, a request for access to the bait server, wherein the bait server's address is not published to a network and wherein receipt of the request indicates that a virus attack is in progress;
    identifying an offending system from which the request originated;
    alerting a local server that the virus attack is in progress and of the identity of the offending system; and
    disconnecting the offending system from the network.

2. The method as recited in claim 1, further comprising:
    prior to disconnecting the offending system, notifying the offending system that it is infected with a virus.

3. The method as recited in claim 1, further comprising:
    receiving a reconnect request from the offending system;
    verifying that the offending system is disinfected and available to reconnect to the network; and
    reconnecting the offending system to the network.

4. The method as recited in claim 1, further comprising:
    instructing all devices within the network to ignore all requests from the offending system until the offending system has been disinfected and is available for network communication.

5. A method in a bait server for detecting the presence of a computer virus, the method comprising:
    not publishing the bait server's address to a network;
    receiving a request for access from the network, wherein receipt of the request indicates that a virus is present;
    determining the identity of an offending system within the network from which to virus entered the network;
    notifying a local server of the presence of the virus and the identity of the offending system;
    instructing all devices within the network to ignore all requests from the offending system until the offending system has been disinfected and is available for network communication;
    directing the local server to disconnect the offending system from the network; and
    responsive to an indication that the offending system has been disinfected and responsive to a reconnect request from the offending system to the local server, reconnecting the offending system to the network.

6. A computer program product in a computer readable media for use in a data processing system for detecting the presence of a computer virus, the computer program product comprising;
    first instructions for receiving, at a bait server, a request for access to the bait server, wherein the bait server's address is not published to a network and wherein receipt of the request indicates that a virus attack is in progress;
    second instructions for identifying an offending system from which the request originated;
    third instructions for alerting a local server that the virus attack is in progress and the identity of the offending system; and
    fourth instructions for disconnecting the offending system from the network.

7. The computer program product as recited in claim 6, further comprising:
    fifth instructions for, prior to disconnecting the offending system, notifying the offending system that it is infected with a virus.

8. The computer program product as recited in claim 6, further comprising:
    fifth instructions for receiving a reconnect request from the offending system;
    sixth instructions for verifying that the offending system is disinfected and available to reconnect to the network; and
    seventh instructions for reconnecting the offending system to the network.

9. The computer program product as recited in claim 6, further comprising:
    fifth instructions for instructing all devices within the network to ignore all requests from the offending system until the offending system is reauthorized for network communication.

10. A computer program product in a computer readable media for use in a data processing system in a bait server for detecting the presence of a computer virus, the computer program product comprising:
    first instructions for not publishing the bait server's address published to a network;
    second instructions for receiving a request for access from the network, wherein receipt of the request indicates that a virus is present;
    third instructions for determining the identity of an offending system within the network from which the virus entered the network;
    fourth instructions for notifying a local server of the presence of the virus and the identity of the offending system;
    fifth instructions for instructing all devices within the network to ignore all requests from the offending system until the offending system is reauthorized for network communication;
    sixth instructions for directing a local server to disconnect the offending system from the network; and
    seventh instructions, responsive to an indication that the offending system has been disinfected and responsive to a reconnect request from the offending system to the local server, for reconnecting the offending system to the network.

11. A system for detecting the presence of a computer virus, the system comprising;
    a receiver, at a bait server, which receives a request for access to the bait server, wherein the bait server's address is not published to a network and wherein receipt of the request indicates that a virus attack is in progress;
    an identifying unit which identifies an offending system from which the request originated;

a virus alert unit which alerts a local server that the virus attack is in progress and the identity of the offending system; and a disconnection unit which disconnects the offending system from the network.

12. The system as recited in claim 11, further comprising:

a notification unit which, prior to disconnecting the offending system, notifies the offending system that it is infected with a virus.

13. The system as recited in claim 11, further comprising:

a reconnect request unit which receives a reconnect request from the offending system;

a verification unit which verifies that the offending system is authorized to reconnect to the network; and a reconnecting unit which reconnects the offending system to the network.

14. The system as recited in claim 11, further comprising:

a network protection unit which instructs all devices within the network to ignore all requests from the offending system until the offending system is reauthorized for network communication.

15. A system in a bait server for detecting the presence of a computer virus, the system comprising:

a receiving unit which receives a request for access from a network, wherein the bait server's address is not published to the network and wherein receipt of the request indicates that a virus is present;

an identifier unit which determines the identity of an offending system within the network from which the virus entered the network;

a notification unit which notifies a local server of the presence of the virus and the identity of the offending system;

a network protection unit which instructs all devices within the network to ignore all requests from the offending system until the offending system is reauthorized for network communication;

a disconnection unit which directs a local server to disconnect the offending system from the network; and a reconnection unit which, responsive to an indication that the offending system has been disinfected and responsive to a reconnect request from the offending system to the local server, reconnects the offending system to the network.

* * * * *